Feb. 15, 1938.     M. LOW     2,108,070
METHOD OF AND APPARATUS FOR SHAPING PLASTIC MATERIALS
Original Filed July 9, 1934    9 Sheets-Sheet 1

Inventor
Marshall Low

Feb. 15, 1938. M. LOW 2,108,070
METHOD OF AND APPARATUS FOR SHAPING PLASTIC MATERIALS
Original Filed July 9, 1934 9 Sheets-Sheet 3

Inventor
Marshall Low

Feb. 15, 1938.    M. LOW    2,108,070
METHOD OF AND APPARATUS FOR SHAPING PLASTIC MATERIALS
Original Filed July 9, 1934    9 Sheets-Sheet 4

Inventor
Marshall Low

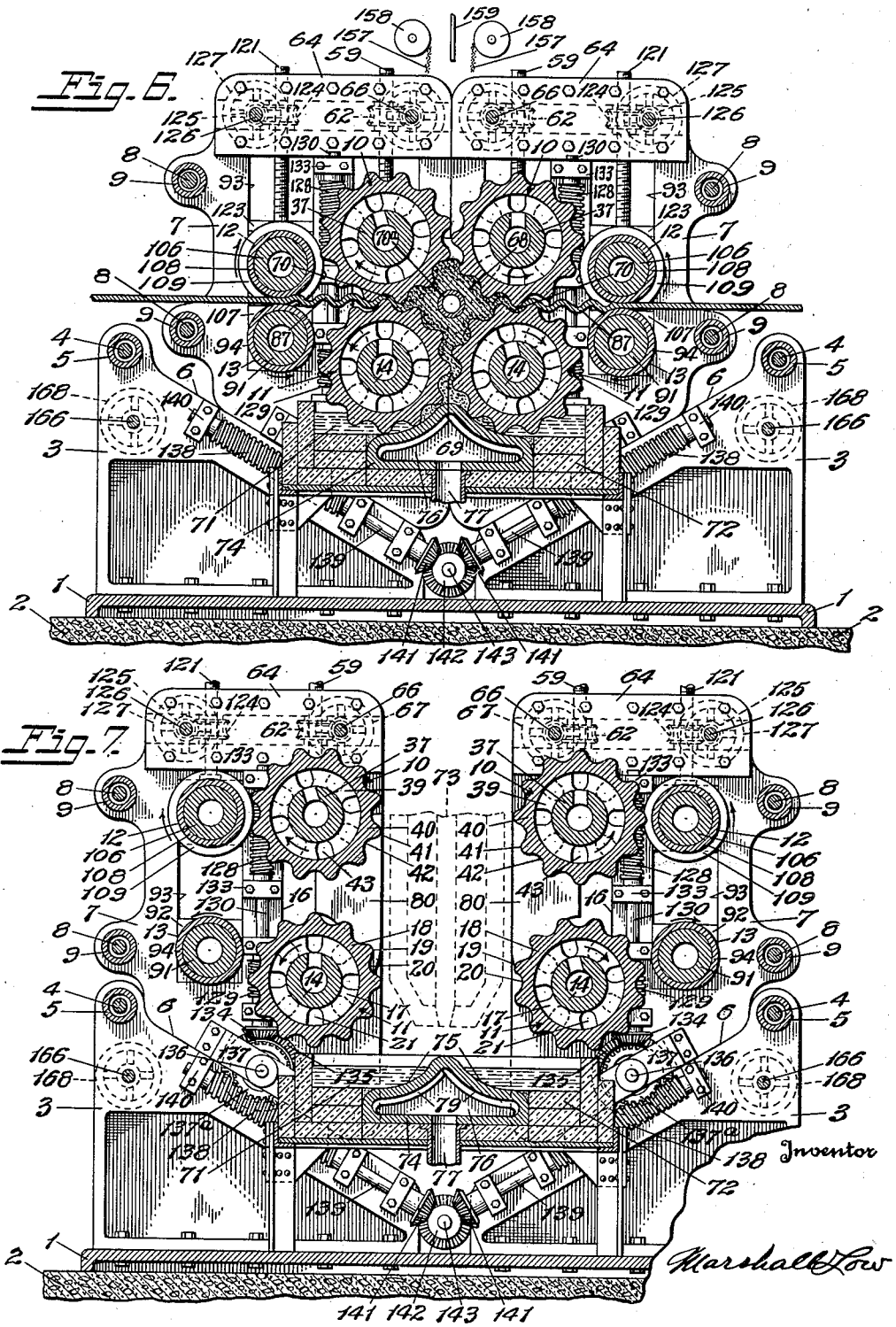

Feb. 15, 1938.  M. LOW  2,108,070
METHOD OF AND APPARATUS FOR SHAPING PLASTIC MATERIALS
Original Filed July 9, 1934   9 Sheets-Sheet 6
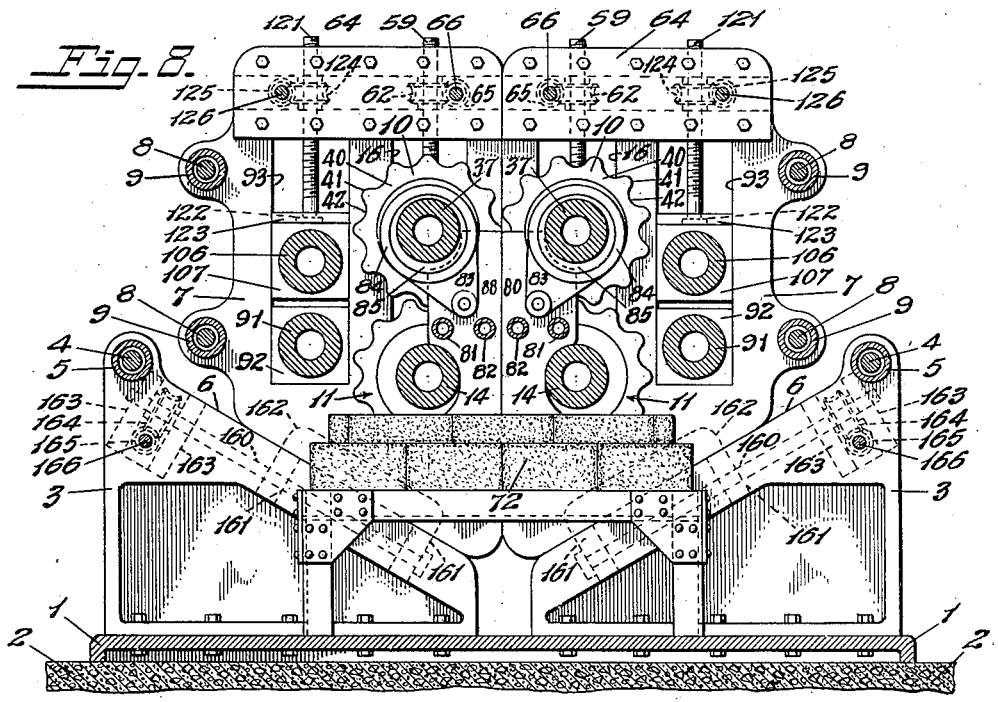
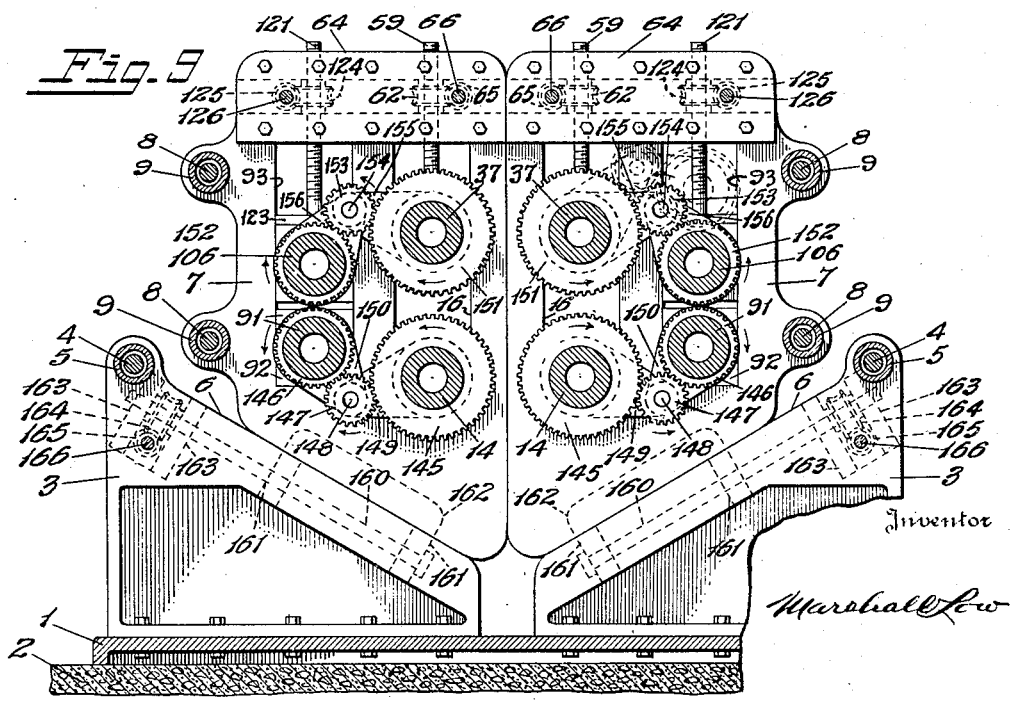
Inventor
Marshall Low Feb. 15, 1938.  M. LOW  2,108,070

METHOD OF AND APPARATUS FOR SHAPING PLASTIC MATERIALS

Original Filed July 9, 1934   9 Sheets-Sheet 7

Inventor
Marshall Low

Feb. 15, 1938.  M. LOW  2,108,070

METHOD OF AND APPARATUS FOR SHAPING PLASTIC MATERIALS

Original Filed July 9, 1934   9 Sheets—Sheet 8

Inventor
Marshall Low

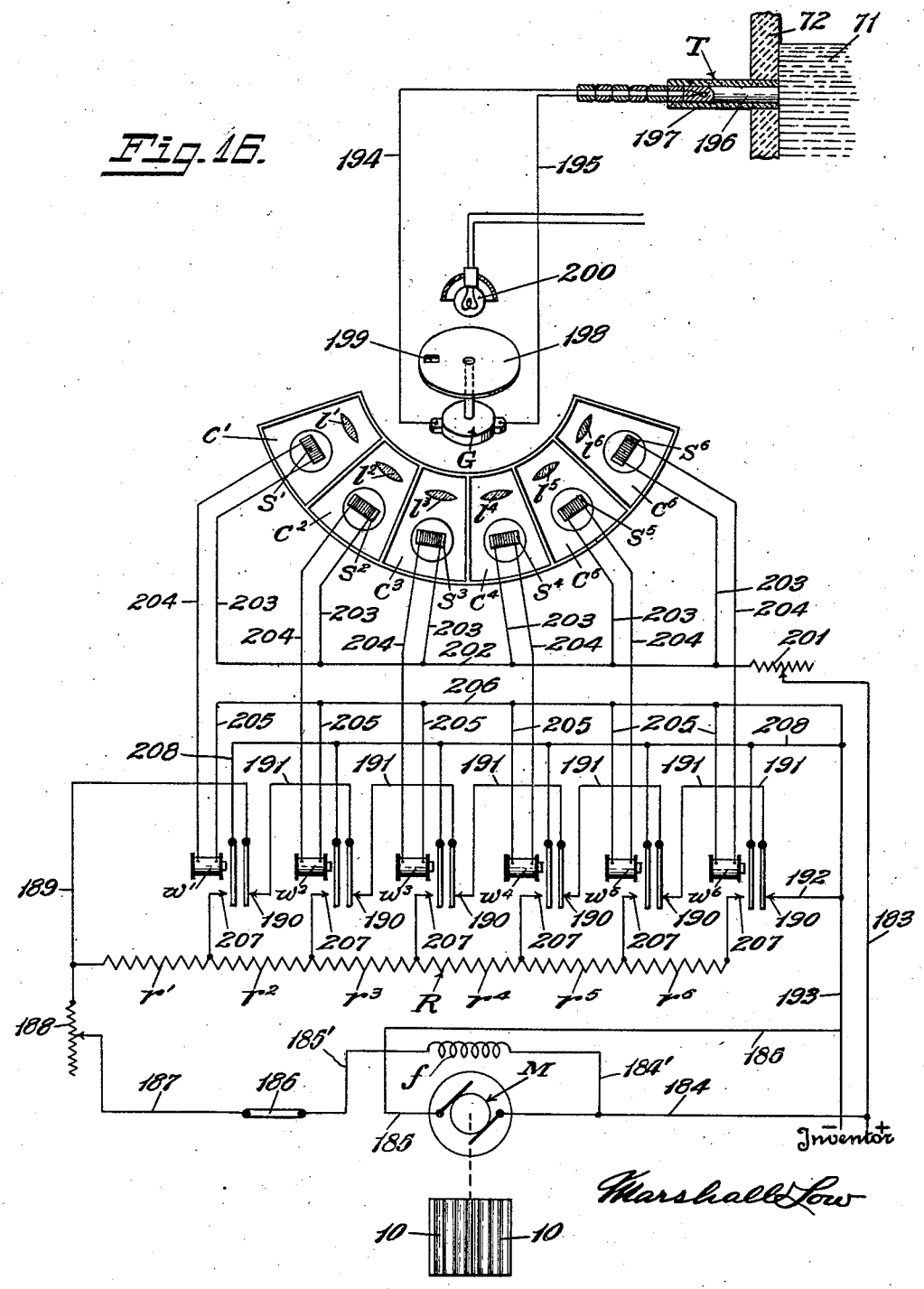

Patented Feb. 15, 1938

2,108,070

UNITED STATES PATENT OFFICE 2,108,070

METHOD OF AND APPARATUS FOR SHAPING PLASTIC MATERIALS

Marshall Low, Washington, D. C.

Application July 9, 1934, Serial No. 734,348
Renewed May 13, 1937

25 Claims. (Cl. 22—57.5)

This invention relates to a method of and apparatus for shaping plastic materials and it has particular relation to a method of and apparatus for continuously solidifying and shaping materials which are fluid when subjected to heat, such as is disclosed in applicant's co-pending continuing application, Serial No. 636,080, filed October 3, 1932 of which this application is a continuation in part.

Heretofore, efforts have been made to roll iron and steel continuously from a body of molten metal by introducing the metal, while in a molten state, downwardly between a pair of rotating rolls, but such efforts have thus far been unsuccessful commercially by reason of certain inherent difficulties encountered in this type of apparatus. It has been experienced, among other things, that when such an apparatus was initially placed in operation it was necessary to close the space between the rolls either by moving the rolls toward one another or by obstructing the space therebetween by a gate or plug so as to prevent the hot metal from flowing downwardly therebetween before it had time to become solidified by contact therewith. Also, the fluid level of the pool of metal between the rolls would fluxuate, with the result that the metal flowed unevenly between the rolls in accordance with the hydrostatic head. Also, when the hot metal was poured into the pool its inertia would penetrate the body of the metal to a point adjacent a line of tangency between the rolls and melt the metal already solidified which resulted in flaws and soft spots in the rolled sheet or bar. Also, if the metal near the line of tangency between the rolls became solidified beyond a certain degree it would not be carried between the rolls but, on the contrary, it would be extruded upwardly thereby and ride on the relatively smooth rolls. Also, the rate of solidification of the metal in contact with the rolls was greatly retarded by reason of the fact that this metal was also in direct molecular contact with the parent body of molten metal thereabove and subject to the conduction of heat therefrom. Also, the only force tending to cause the metal to pass between the rolls was that exerted by gravity as the coefficient of friction between the metal and the relatively smooth surfaces of the rolls was negligible. And lastly, great difficulty was experienced in obtaining the proper cooling and solidification of the metal.

One of the objects of the present invention is to avoid all of the difficulties hereinabove mentioned, by positively feeding the molten metal upwardly by a pair of cooling and shaping rolls partially immersed in a body of molten metal, at a uniform and constant rate irrespective of the influence of gravity or the hydrostatic level of the molten metal in the pool, thereby resulting in a rolled strip or bar of metal of greater and more uniform density.

Another object of the invention is to provide a device of the character described by means of which bodies of metal of predetermined size are segregated from the parent body of metal in the pool and subjected to uniform cooling while entirely out of contact with such body, thus materially accelerating the rate of solidification of the metal.

Still another object of the invention is the provision of a method of and means for segregating successive bodies of material from a parent body of molten metal cooling the same so as to form a relatively plastic mass, uniting the segregated bodies under pressure to form a homogeneous mass, kneading the material during the cooling stages thereof so as to reduce the crystalline structure thereof and to force out any gases or air bubbles trapped therein, and simultaneously producing a plurality of sheets, plates or bars having a dense crystallined structure from the material thus conditioned.

A further object of the invention is the provision of a simple and efficient system for cooling the several parts of the apparatus and the material delivered thereto in a molten state so as to accelerate the rate of solidification of the material and the speed of operation of the entire apparatus, and also for reducing the temperature of the metal and sheet fabricated therefrom uniformally longitudinally of the rolls.

A still further object of the invention is the provision of means for effectively stripping the metal strips, sheets or bars from the cooling and forming rolls and leading the same between the flattening or finishing rolls, when the apparatus is initially started.

Another object of the invention is the provision of means for moving the rolls and feeding means relative to one another so as to interrupt the feeding of the material.

Still another object of the invention is the provision of means for automatically controlling the speed of rotation of the rolls in accordance with the plasticity of the material or the temperature of the metal.

With such objects in view, as well as other advantages which may be incident to the use of the improvements, the invention consists of the parts and combinations thereof hereinafter set forth and claimed with the understanding that the several necessary elements constituting the same may be varied in proportion and arrangement without departing from the nature and scope of the invention as defined in the appended claims.

In order to make the invention more clearly understood there are shown in the accompanying drawings, means for carrying the invention into practical effect, without limiting the improvements in their useful application to the particular constructions, which for the purpose of explanation has been made the subject of illustration.

In the accompanying drawings:

Figure 6 is a vertical transverse sectional view taken on line 6—6 of Fig. 1 and illustrating the cooling and shaping rolls in their operative or sheet forming positions.

Figure 7 is a view similar to Fig. 6 but illustrating the rolls in their separated or inoperative positions.

Figure 8 is a vertical transverse sectional view taken on line 8—8 of Fig. 1 and illustrating the vertically reciprocable end members.

Figure 9 is a vertical transverse sectional view taken on line 9—9 of Fig. 1 and illustrating the adjustable driving connections between the cooling and shaping rolls and their associated flattening rolls.

Figure 16 is a diagrammatic view of the thermo-responsive means for automatically varying the speed of rotation of the rolls in accordance with the temperature of the metal.

Figure 1:
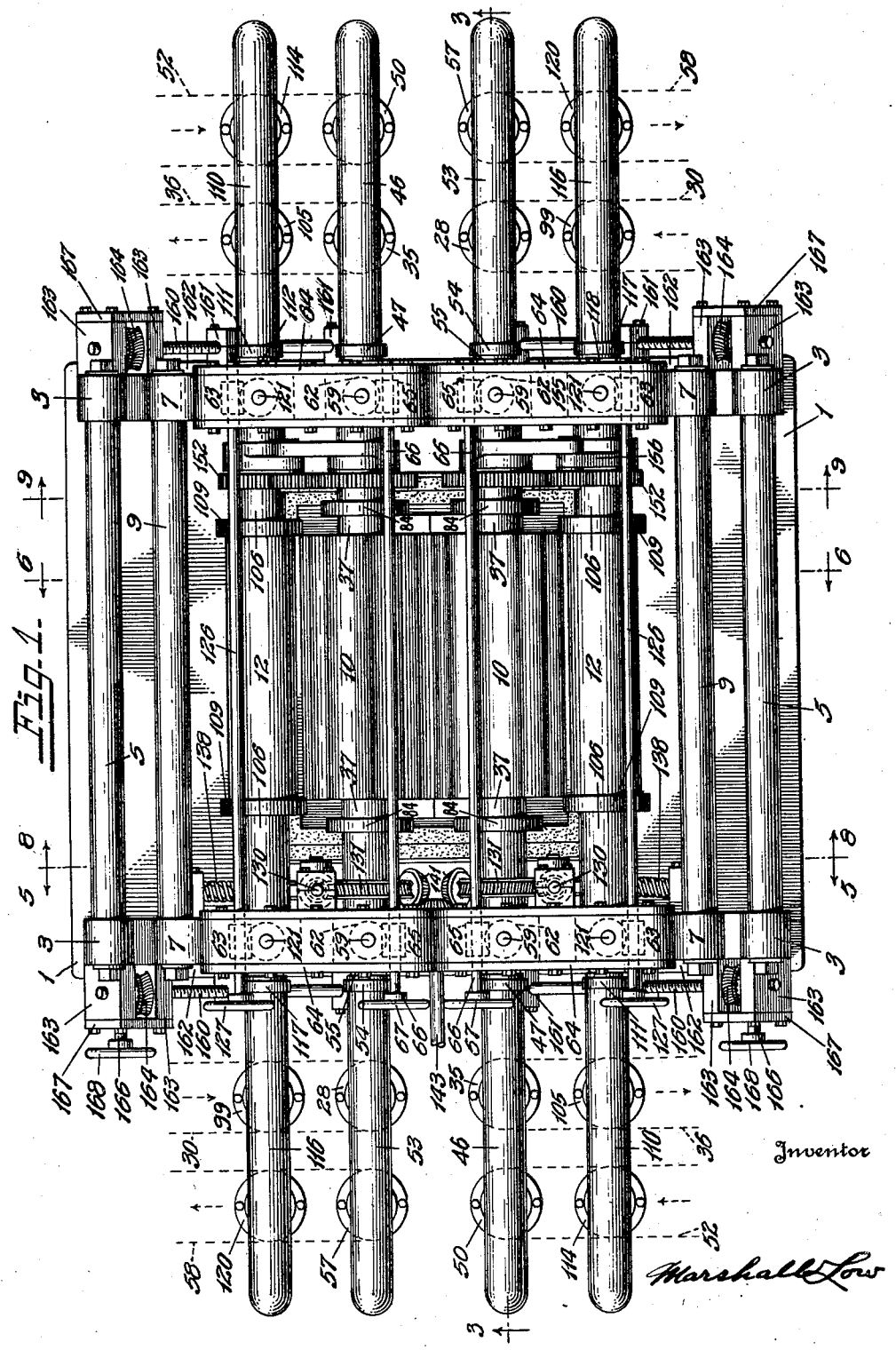
Figure 1 is a plan view of an apparatus constructed in accordance with the present invention.
Figure 2:
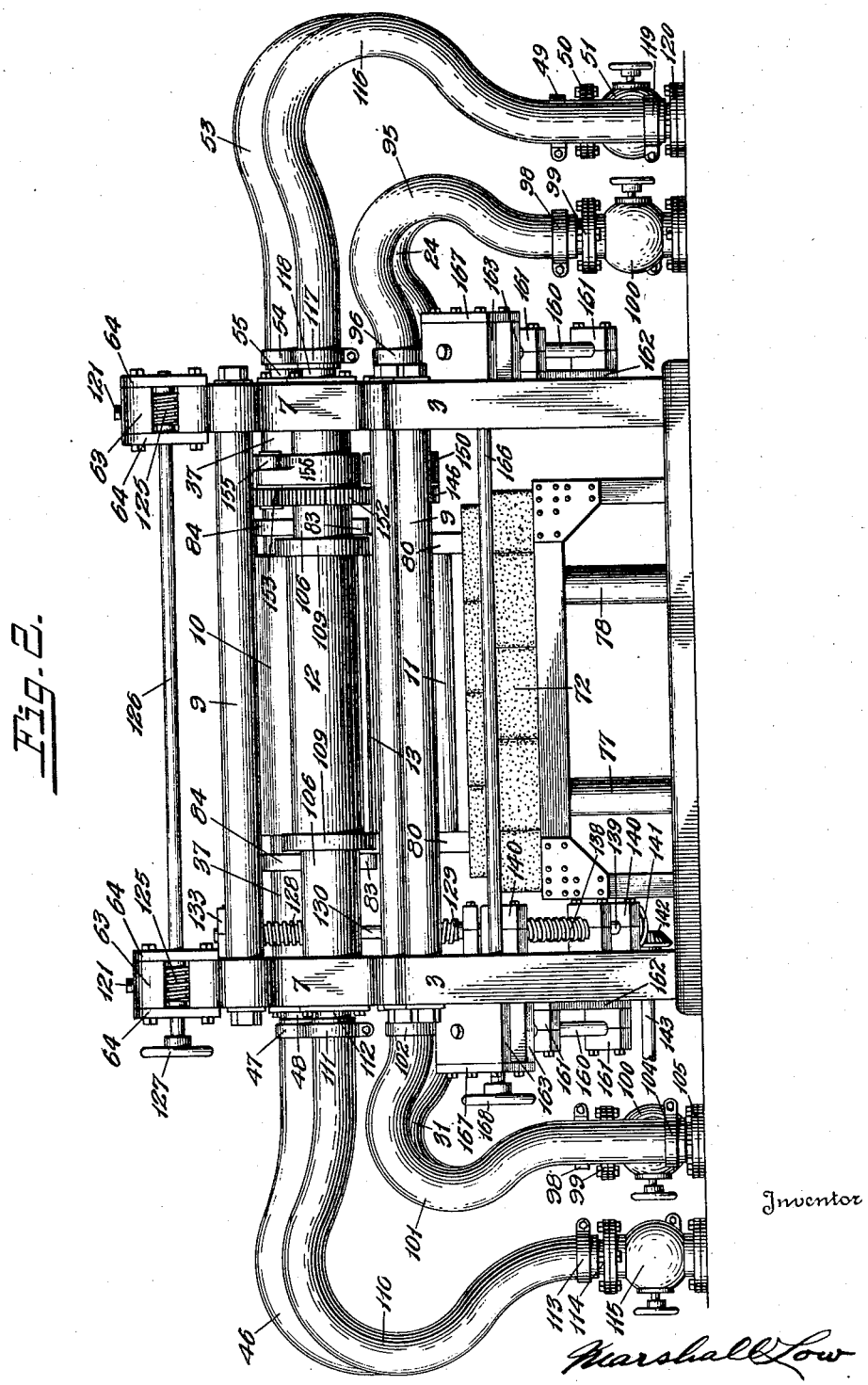
Figure 2 is a side elevational view of the structure illustrated in Fig. 1.
Figure 3:
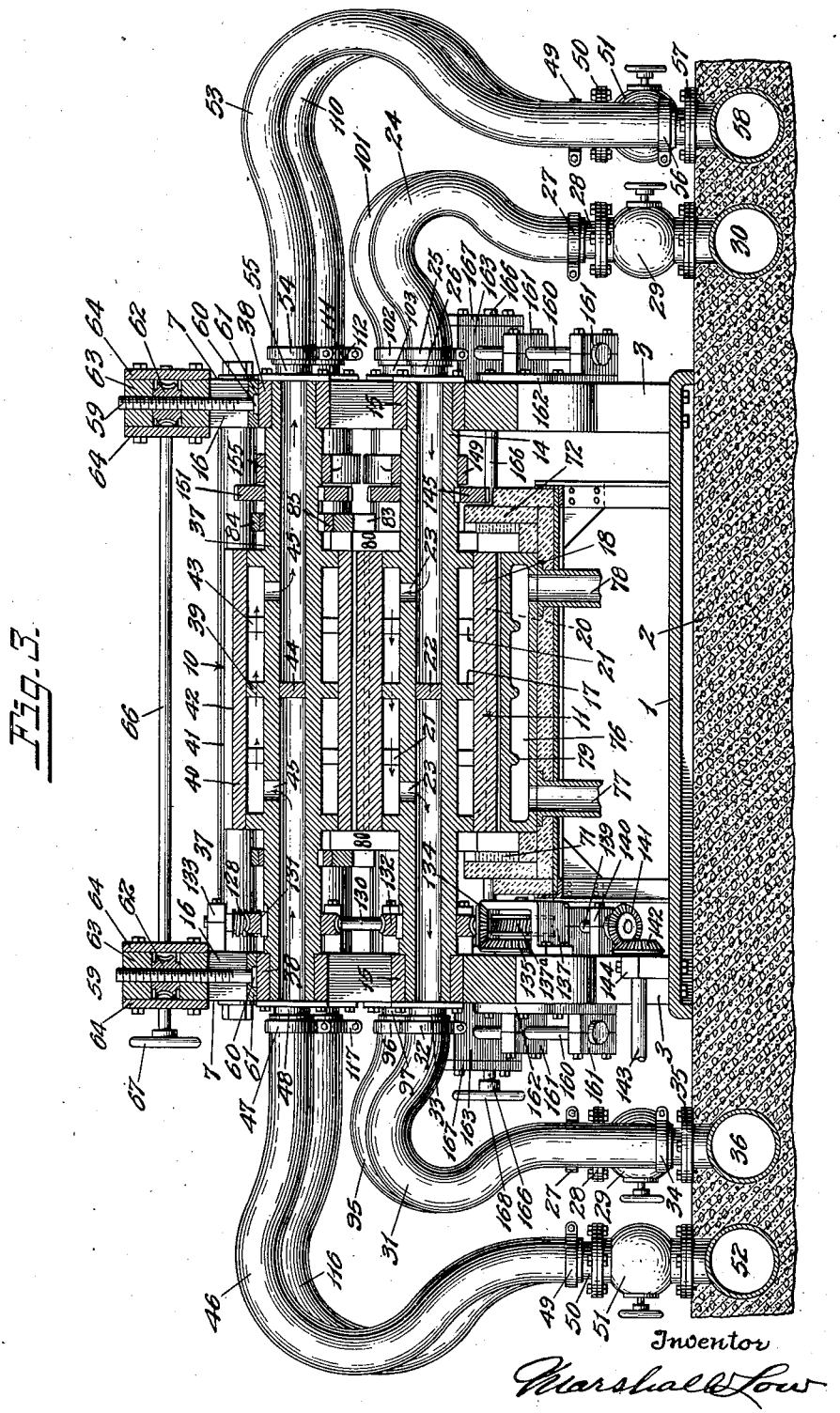
Figure 3 is a vertical longitudinal sectional view taken on line 3—3 of Fig. 1.

Referring to the drawings, and particularly to Figs. 1 to 9 thereof, an apparatus embodying the present invention is shown as comprising a base 1 preferably of cast construction, suitably anchored upon a concrete foundation 2, and having opposed frame members 3 secured thereto adjacent its edges at what may be termed the front and rear of the apparatus, corresponding frame members being tied together adjacent to their outer ends by bolts 4 and spacing tubes 5. The upper surfaces of the frame members 3 are inclined downwardly and inwardly and provide tracks 6 upon which carriage members 7 are slidably keyed for movement toward and away from one another (Figs. 6 and 7). The corresponding carriage members 7, that is to say the carriage members at each side of the apparatus, are also tied together to move in unison by means of bolts 8 and spacing tubes 9 and support upper and lower cooling and shaping rolls 10 and 11 respectively and also upper and lower flattening rolls 12 and 13.

The lower rolls 11 comprise tubular shafts 14 the ends of which are journaled in floating bearings 15 (Fig. 3) which are mounted for vertical sliding movement in ways 16 provided in the carriage members 7. The intermediate portions of the shafts 14 are formed with spaced collars 17 upon which outer shells 18 formed with a plurality of circumferentially arranged longitudinally extending elevations 19 and depressions 20, are fixed, preferably by shrinking. The collars 17 are formed with openings 21, the openings in adjacent collars being staggered or offset circumferentially relative to one another so as to cause a temperature controlling medium to traverse a tortuous path in passing through the rolls from end to end (Fig. 3), as will hereinafter be described. The tubular shafts 14 are provided with partitions 22 intermediate their ends and also with openings 23 adjacent to the ends of the rolls for establishing communication between the tubular shafts and the interior of the lower rolls at each end thereof.

A suitable temperature controlling medium which may be live steam or an inert gas, air, or water refrigerated or otherwise according to the nature of the material to be shaped by the rolls, is directed through the roll 5 from end to end in one direction and through the other of the lower in an opposite direction, from flexible inlet pipes 24, the upper ends of which are secured by means of clamping straps 25 to tubular flanged nipples 26 which are bolted to the outer surfaces of the floating bearings 15 in axial alignment with the tubular shafts 14. The lower ends of the inlet pipes 24 are secured by clamping straps 27 to flanged nipples 28 mounted on inlet valves 29 which control communication between the inlet pipes 24 and supply mains or conduits 30 located at the front and rear of the apparatus (Fig. 1).

After passing through the lower rolls 11 the temperature controlling medium escapes from these rolls through flexible outlet pipes 31 the upper ends of which are secured by means of clamping straps 32 to flanged nipples 33 which are bolted to the floating bearings 15 at the other ends of the rolls 11. The lower ends of the outlet pipes 31 are secured by means of clamping straps 34 to flanged nipples 35 which communicate with discharge mains 36 also located at the front and rear of the apparatus.

The upper rolls 10 of each of the pairs of cooling and shaping rolls are substantially the same in construction as the lower rolls in that they also comprise tubular shafts 37, the ends of which are journaled in vertically adjustable slide bearing blocks 38 mounted in the ways 16. The intermediate portions of the shafts 37 are provided with spaced collars 39 upon which outer corrugated shells 40 formed with a plurality of circumferentially arranged longitudinally extending elevations 41 and depressions 42 are fixed, preferably by shrinking. The collars 39 are provided with staggered openings 43, similar to those described in connection with the lower rolls 11. The tubular shafts 37 are also provided with partitions 44 intermediate their ends and also with openings 45 for establishing communication between the shafts 37 and the interior of the rolls 10 at the ends thereof.

A temperature controlling medium is also directed through the upper rolls 10 in opposite directions with respect to one another and in opposite directions with respect to that of the flow of the medium through the associated lower rolls 11, from flexible inlet pipes 46 the upper ends of which are secured by means of clamping straps 47 to tubular flanged nipples 48 bolted to the outside surfaces of the adjustable slide bearing blocks 38. The lower ends of the inlet pipes 46 are secured by clamping straps 49 to flanged nipples 50 mounted on inlet valves 51 which control communication between the inlet pipes 46 and supply mains or conduits 52 located at the front and rear of the apparatus.

After passing through the upper rolls 10 the temperature controlling medium escapes from these rolls through flexible outlet pipes 53 the upper ends of which are secured by means of clamping straps 54 to flanged nipples 55 which are bolted to the outer faces of the adjustable slide bearing blocks 38 at the other side of the apparatus. The lower ends of the outlet pipes 53 are secured by clamping straps 56 to flanged nipples 57 which communicate with discharge mains or conduits 58 also located at the front and rear of the apparatus.

It will be apparent from the foregoing description that the construction and arrangement of the several inlets and outlets is such that the temperature controlling medium flows through the upper and lower rolls 10 and 11 of each of the pairs of rolls in opposite directions, and also that the direction of flow of the medium is in opposite directions where the corresponding rolls of the pairs of rolls are considered. This tends toward an equalization in heat exchange longitudinally of the rolls.

Figure 4:
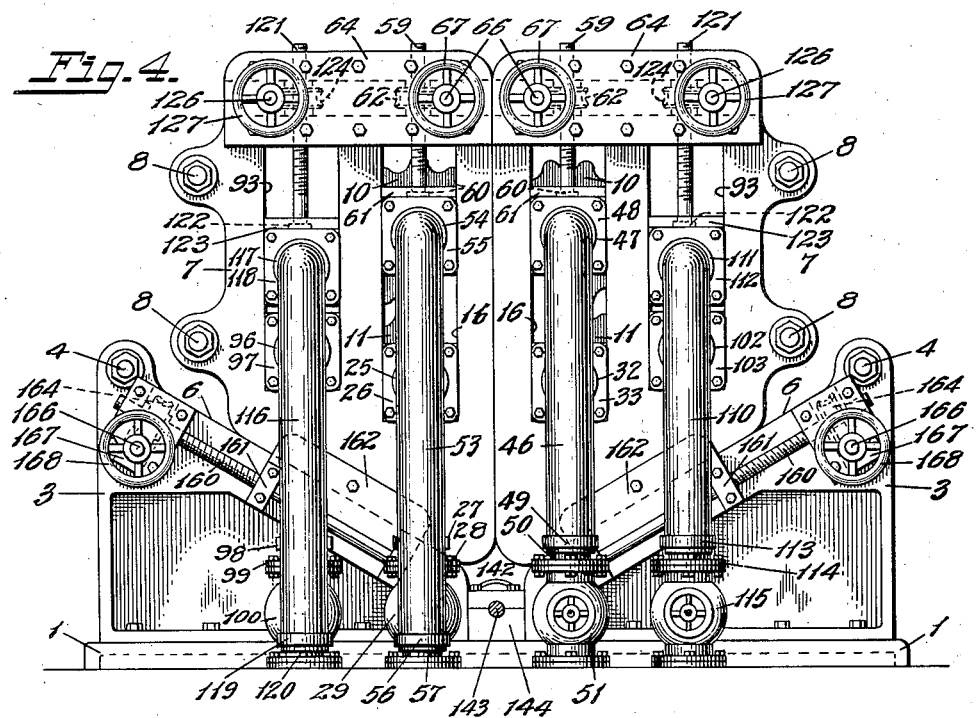
Figure 4 is an end elevational view of the structure illustrated in Fig. 2.
Figure 5:
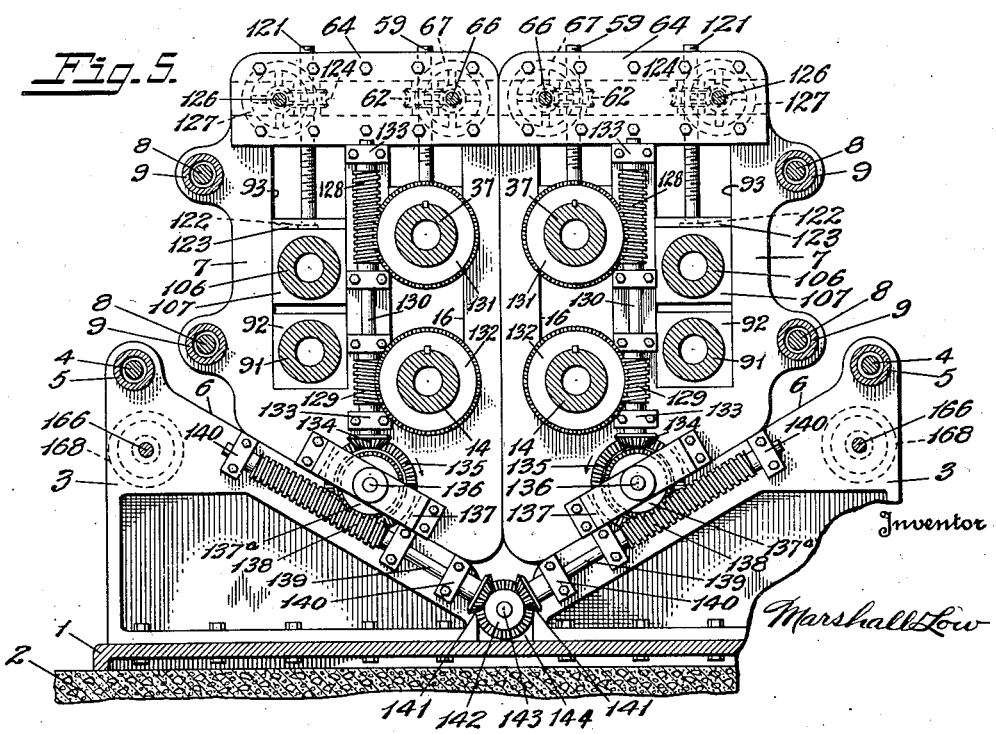
Figure 5 is a vertical transverse sectional view taken on line 5—5 of Fig. 1.

The upper rolls 10 may independently be raised and lowered with respect to the lower rolls 11 in order to provide sheet forming passes of desired size between the rolls of both of the pairs of rolls, by means of adjusting screws 59 having heads 60 at their lower ends which are rotatably confined within keepers 61 bolted to the upper surfaces of the adjustable slide bearing blocks 38 (Figs. 4 and 5). The upper portions of the adjusting screws 59 are threaded into worm nuts 62 which are confined between the upper ends of the carriage members 7 and bars 63 secured to these members by slide plates 64. The worm nuts 62 are rotated in order to raise and lower the adjusting screws 59, slide bearing blocks 38 and rolls 10 journaled therein, by means of worms 65 (Fig. 2) fixed to shafts 66 extending between corresponding carriages and which are journaled in the plates 64. These shafts are provided with hand wheels 67 at their forward ends by means of which both ends of either of the upper rolls 10 may be raised or lowered simultaneously between the positions shown in Figs. 6 and 7.

When the rolls 10 and 11 occupy positions for fabricating two sheets simultaneously, as illustrated in Fig. 6, the rolls cooperate to define a substantially closed chamber 68 (Fig. 6) provided with an entrance 69 and two oppositely disposed sheet forming passes 70.

Figure 12:
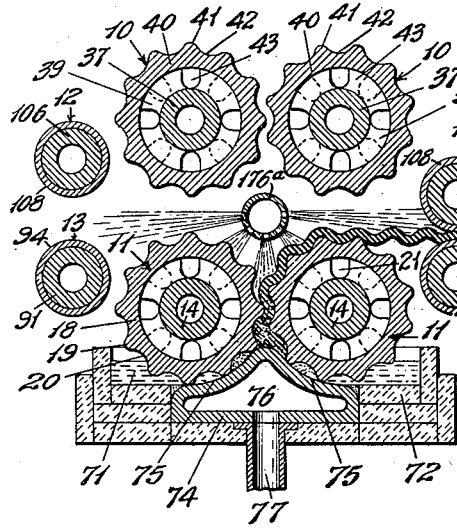
Figure 12 is a diagrammatic vertical transverse sectional view illustrating the position of the rolls when the structure shown in Figs. 1 to 9 is employed to fabricate a single sheet.

The apparatus may be employed to fabricate a single sheet by elevating the upper rolls 10 to inoperative positions and leading the strip over either of the lower rolls 11 as is diagrammatically shown in Fig. 12. In such event the strip may be additionally cooled by projecting a cooling medium from a pipe 70a against the sheet while it is still supported on the lower roll 11.

The lower portions of either or both of the lower rolls 11 are adapted to be immersed in a lake or pool 71 of fluid or plastic material such as paper pulp, molten glass or molten metal which is contained in a receptacle or forehearth 72 which may be supplied with material in any suitable manner. For example, molten glass or metal may be introduced into the forehearth 72 from a ladle 73 located above the forehearth or from an open-hearth or induction furnace or directly from a converter, not shown.

Mounted in the forehearth 72 and directly between the lower rolls 11 and between the axes of rotation thereof, is a bridging member or abutment 74, of cast iron construction, which is formed with two curved surfaces 75 having a radius of curvature conforming substantially to the maximum radius of the rolls 11. These surfaces 75 in effect constitute a continuation of the bottom of the forehearth 72 and are adapted to be frictionally engaged by the elevations 19 of both of the lower rolls 11 when the same are rotated. The bridging member 74 is formed with a chamber 76 through which a temperature controlling medium such as water or steam may also be circulated through inlet and outlet pipes 77 and 78 respectively, communicating in any suitable manner with the supply and discharge mains previously referred to. The bridging member or abutment 74 is also formed with a plurality of reinforcing ribs 79 for strengthening the surfaces 75 and for accelerating the dissipation of heat therefrom.

Mounted contiguous with the ends of both the upper rolls 10 and the lower rolls 11 and also with the ends of the bridging member 74, is a pair of end members 80 which, when the rolls occupy the operative positions shown in Fig. 8, prevents the escape of material from the depressions 20 of the lower rolls 11 and also from the chamber 68. These end members may be constructed of any suitable refractory material such as firebrick or lava rock or they may be of hollow cast metal construction, in which case a temperature controlling medium may be circulated therethrough from inlet and outlet pipes 81 and 82 communicating with a suitable source of supply and discharge (not shown). These members are supported by hangers 83 which are pivotally connected thereto at their lower ends and which are provided with strap portions 84 at their upper ends for engagement with eccentrics 85 fixed to the shafts 37 of the upper rolls 10. By means of this construction the end members 80 are reciprocated vertically as the rolls 10 are rotated, thus exerting a shearing action against the ends of the rolls such as will prevent material from sticking to the end members. The end members 80 are prevented from endwise displacement by the eccentrics 85 and hangers 83.

It will be apparent from the foregoing that when the rolls 10 and 11 are rotated the latter cooperate with the bridging member 74 in the manner of a gear pump in that the elevations and depressions 19 and 20 segregate successive quantities of material, indicated at 86 in Fig. 6, from the pool 71 and subjects these bodies to the cooling or drying effect of the rolls and bridging member at points remote from the parent body of material. The continued rotation of the rolls 11 carries these segregated quantities of material through the entrance 69 and into the chamber 68. During the passage of the material to the chamber 68 the segregated quantities of material are reunited to form a homogeneous plastic mass and is also subjected to a kneading action such as will expel trapped gases and reduce the crystalline structure if the material is metal. The continued rotation of the rolls 10 and 11 carries the material, which by now has become relatively plastic, outwardly in opposite directions through the sheet forming passes 70 defined by the corresponding rolls of the pairs of rolls 10 and 11 and is fabricated thereby simultaneously into two sheets of substantially sinuous section indicated at 87 in Fig. 6. If desired a temperature controlling medium may also be circulated through a pipe 70a which extends through the chamber 68 in order to accelerate the conditioning of the material prior to its passage through the sheet forming passes 70. After passing from between the rolls 10 and 11 the corrugated sheets 87 pass between the upper and lower cooling and flattening rolls 12 and 13 respectively which remove the corrugations from the sheet and impart smooth finishes thereto.

The lower flattening rolls 13 comprise tubular shafts 91 the ends of which are journaled in floating bearing blocks 92 which are mounted in ways 93 provided in the carriage members 7. A shell 94 is shrunk onto each of the shafts 91 and constitute the sheet engaging portions of these rolls.

A temperature controlling medium is also directed through the lower flattening rolls 13 from end to end, from flexible inlet pipes 95, the upper ends of which are secured by means of clamping straps 96 to flanged nipples 97 which are bolted to the outer surfaces of the floating bearing blocks 92. The lower ends of the inlet pipes 95 are secured by clamping straps 98 to flanged nipples 99 mounted on inlet valves 100 which control communication between the inlet pipes 95 and the supply mains 30.

After passing through the lower flattening rolls 13 the temperature controlling medium escapes from these rolls through flexible outlet pipes 101 the upper ends of which are secured by means of clamping straps 102 to flanged nipples 103 which are bolted to the outer surfaces of the floating bearing blocks 92 at the other ends of the flattening rolls 13. The lower ends of the outlet pipes 101 are secured by clamping straps 104 to flanged nipples 105 which communicate with the discharge mains 36.

The upper flattening rolls 12 are of substantially the same construction as the lower rolls 13 in that they also comprise tubular shafts 106 the ends of which are journaled in vertically adjustable bearing blocks 107 which are also slidably mounted in the ways 93. A shell 108 is shrunk onto each of the shafts 106 and also form the sheet engaging portions of these rolls. The upper flattening rolls 12 are provided with end flanges 109 which overlap the edges of the shells 94 of the cooperating lower rolls 13 to prevent the material from spreading laterally while passing between the flattening rolls and to provide finished edges to the flattened sheets.

A temperature controlling medium is also directed through the upper flattening rolls 12 from flexible inlet pipes 110 which are located at the other end of the rolls from the inlet pipes 95 and which are secured by means of clamping straps 111 to flanged nipples 112 which are bolted to the outer surfaces of the vertically adjustable bearing blocks 107 at the other ends of the rolls 12. The lower ends of the inlet pipes 110 are secured by clamping straps 113 to flanged nipples 114 mounted on inlet valves 115 which control communication between the inlet pipes 110 and the supply mains 52.

After passing through the upper flattening rolls 12 the temperature controlling medium escapes from these rolls through flexible outlet pipes 116 the upper ends of which are secured by means of clamping straps 117 to flanged nipples 118 which are bolted to the outer surfaces of the vertically adjustable bearing blocks 107 located at the opposite end of the rolls from the inlet pipes 110. The lower ends of the outlet pipes 116 are secured by clamping straps 119 to flanged nipples 120 which communicate with the discharge mains 58.

The upper flattening rolls 12 may independently be raised and lowered with respect to the lower rolls 13 in order to provide a sheet forming pass of the desired size between either or both of the pairs of flattening rolls, by means of adjusting screws 121 having heads 122 at their lower ends which are rotatably confined within keepers 123 bolted to the upper surfaces of the adjustable slide bearing blocks 107. The upper portions of the adjusting screws 121 are threaded into worm nuts 124 which are confined between the upper ends of the carriage members 7 and the bars 63. The worm nuts 124 are rotated in order to raise and lower the adjusting screws 121, slide bearing blocks 107 and rolls 12 journaled therein, by means of worms 125 fixed to shafts 126 journaled in the plates 64. These shafts also extend between corresponding carriage members 7 and are provided with hand wheels 127 at their forward ends by means of which both ends of either of the upper rolls 89 may be raised or lowered simultaneously between the positions also shown in Figs. 6 and 7.

The rolls 10 and 11 of both pairs of rolls are rotated in the directions indicated by the arrows in Figures 6 and 7 in order to fabricate two sheets simultaneously when the rolls occupy their operative positions (Fig. 6) and also to free them from material when they occupy their inoperative positions (Fig. 7), by means of upper and lower worms 128 and 129 (Fig. 5) which are fixed to vertically extending shafts 130 for intermeshing engagement with worm gears 131 and 132 fixed to the tubular shafts 37 and 14 respectively. The shafts 130 are journaled in bearings 133 carried by the carriage members 7 at the front of the apparatus and are provided with beveled pinions 134 at their lower ends for intermeshing engagement with beveled gears 135. The beveled gears 135 are keyed to stud shafts 136 journaled in the carriage members 7 and brackets 137 carried thereby, and fixed to the sides of the gears 135 are worm gears 137a which mesh with and are driven by elongated worms 138. These worms are fixed to shafts 139 which are journaled in bearings 140 carried by the end frame members 3 and are provided at their inner ends with beveled pinions 141 for intermeshing engagement with a single beveled gear 142. The gear 142 is fixed to the inner end of a main drive shaft 143 which is journaled in bearings 144 carried by the base 1 and which is driven in any suitable manner by a variable speed electric motor M (Fig. 16).

The upper worms 128 are of elongated construction so as to permit the rolls 10 to be raised and lowered, as hereinbefore described, without interrupting driving engagement between the worms 128 and the associated worm gears 131, thus enabling the rolls 10 to be rotated in all positions within their range of vertical adjustment, as indicated by broken lines in Fig. 9.

The lower flattening rolls 13 are rotated by spur gears 145 (Fig. 9) which are fixed to the lower tubular shafts 14 at the rear of the apparatus and which drive gears 146 fixed to the shafts 91 through the medium of idler pinions 147. These pinions are journaled on stud shafts 148 which are in turn journaled in arms 149 and 150 which are carried by the shafts 14 and 91 for swinging movement thereon. This construction insures that the pinions 147 will traverse paths concentric or planetary with respect to both the gears 145 and 146 and thus maintain driving connections between the rolls 11 and the rolls 13 when either or both of these rolls are adjusted as previously described.

In a like manner, the upper flattening rolls 12 are rotated by gears 151 fixed to the shafts 37 and which drive gears 152 fixed to the shafts 106 through the medium of idler pinions 153. These pinions are also journaled on stud shafts 154 which are in turn journaled in arms 155 and 156 carried by the shafts 37 and 106 for swinging movement thereon.

The ratio between the gears 145 and 146 and between the gears 151 and 152 is such that the speed of rotation of the flattening rolls 12 and 13 is in excess to that of the cooling and shaping rolls 10 and 11. This prevents material from accumulating between these rolls due to the attenuation of the sheets when the corrugations therein are removed.

When the operation of the apparatus is initiated, it is desirable to provide means for conveniently leading or threading the corrugated sheets or strips 87 between the flattening rolls 12 and 13. This may be easily accomplished in several ways. For example, sections 157 (Fig. 6) of wire screen or other suitable material of the necessary length, may be rolled upon spools 158 which are located above the rolls 10 (Fig. 6), and a sheet metal partition 159 lowered between the rolls 10. The sections 157 of wire screen are then threaded downwardly between the rolls 10 on each side of the partition 159 and horizontally outwardly in opposite directions between the rolls 10 and 11, and thence between the flattening and reducing rolls 12 and 13. These sections of screen are then frictionally secured at their upper ends to prevent movement thereof. If the cooling medium is not already circulating through the system, it is then turned on and the rotation of the rolls commenced, after which molten metal is introduced to the forehearth 72. The rolls 10 will slip over the sections 157 of wire screen without imparting any movement thereto, until the plastic material commences to pass outwardly between the rolls 10 and 11 and molds itself around and through the reticulations in the mesh of the sections of screen so that the latter becomes firmly embedded therein. Force is then applied to the outer ends of the sections 157 either manually or mechanically so as to strip the sheets 87 from the rolls 10 and 11 and to draw them outwardly between the rolls 12 and 13. As soon as the flattening rolls 12 and 13 grip the sheets of metal, the tension on the sections 157 is discontinued, and the rolls thereafter automatically draw the sheets and embedded screens outwardly until the sections of screen have left the spools 158 and have been incorporated in the metal of the sheets. As soon as the portions of the sheets 87 containing the embedded sections of screen have passed between the flattening rolls, these portions of the sheets may be severed from the sheet and discarded.

This stripping and guiding of the sheets 87 may also be accomplished by passing an endless band or belt of wire screen around the rolls 10 and their associated upper flattening rolls 12. In this case, as soon as the metal becomes securely interlocked with the screen it will move the latter around the axes of the rolls 10 and 89 until the corrugated sheets 87 pass between the flattening rolls. The upper course or strand of the screen between the rolls 10 and 12 is then severed and drawn outwardly as previously described.

Also, sections of screen may be passed around the lower rolls 11 and 13 for the purpose above described.

Also, the metal sheets 87 may be stripped from the rolls 10 and 11 and led between the associated flattening rolls 12 and 13, by inserting relatively short sections of wire screen horizontally between the rolls 10 and 11 and the rolls 12 and 13. In this case, when the metal commences to pass between the rolls 10 and 11, it will unite with the inner ends of the sections of screen for a short distance only, thus minimizing the length of the metal sheet which is discarded.

Although wire screen has been described in connection with the stripping and guiding of the metal sheets 87, it will be obvious to those skilled in the art that any other suitable means capable of becoming embedded in or interlocked with the metal sheets may be utilized for this purpose, such as wires fed from spools. The wire screens or the like, hereinabove referred to may be employed either for starting the apparatus, or for continuing its operation if necessary.

The corresponding rolls 10 and 11 of the upper and lower pairs of rolls may be separated and simultaneously elevated so as to raise the lower rolls 11 out of the pool of material in the receptacle or forehearth 72 and to discharge material from the space between the rolls when it is desired to interrupt the operation of the apparatus. This is accomplished by means of non-rotatable jackscrews 160 (Fig. 4) which are clamped in bearings 161 carried by plates 162. These plates are fixed to the lower edges of the carriage members 7 and overlap the outer sides of the frame members 3 for sliding engagement therewith and assist in guiding the carriage members 7 when they are slid along the tracks 6. The upper and outer portions of the jackscrews 160 extend through spaced blocks 163 secured to the sides of the frame members 3 and are threaded into worm nuts 164 confined between these blocks. The worm nuts 164 are rotated so as to simultaneously slide the front and rear carriage members 7 in which the corresponding rolls 10 and 11 are mounted, in opposite directions along the tracks 6, by means of worms 165 which are fixed to shafts 166 extending along the sides of the apparatus. These shafts are journaled in plates 167 bolted to the blocks 163 and are provided with hand wheels 168 at their forward ends. By means of this construction either or both of the lower rolls 11 together with the associated upper rolls 10, may quickly and easily be moved out of contact with the material in the receptacle in the event of abnormal operation.

Figure 10:
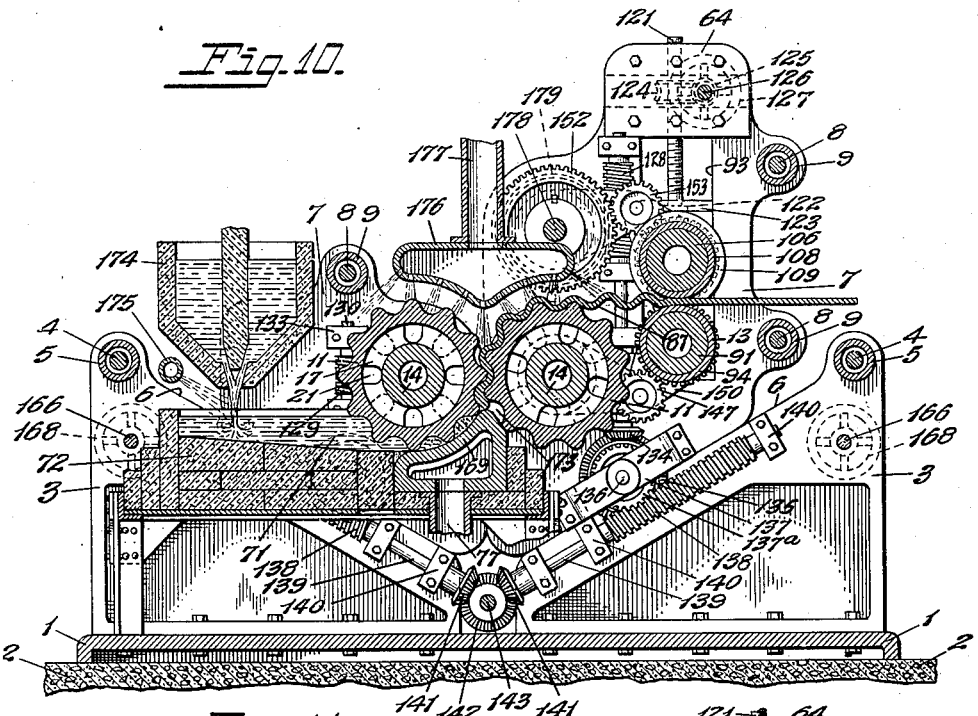
Figure 10 is a vertical transverse sectional view of another form of apparatus embodying the invention and in which only one of the cooling and shaping rolls is employed to feed the material.
Figure 11:
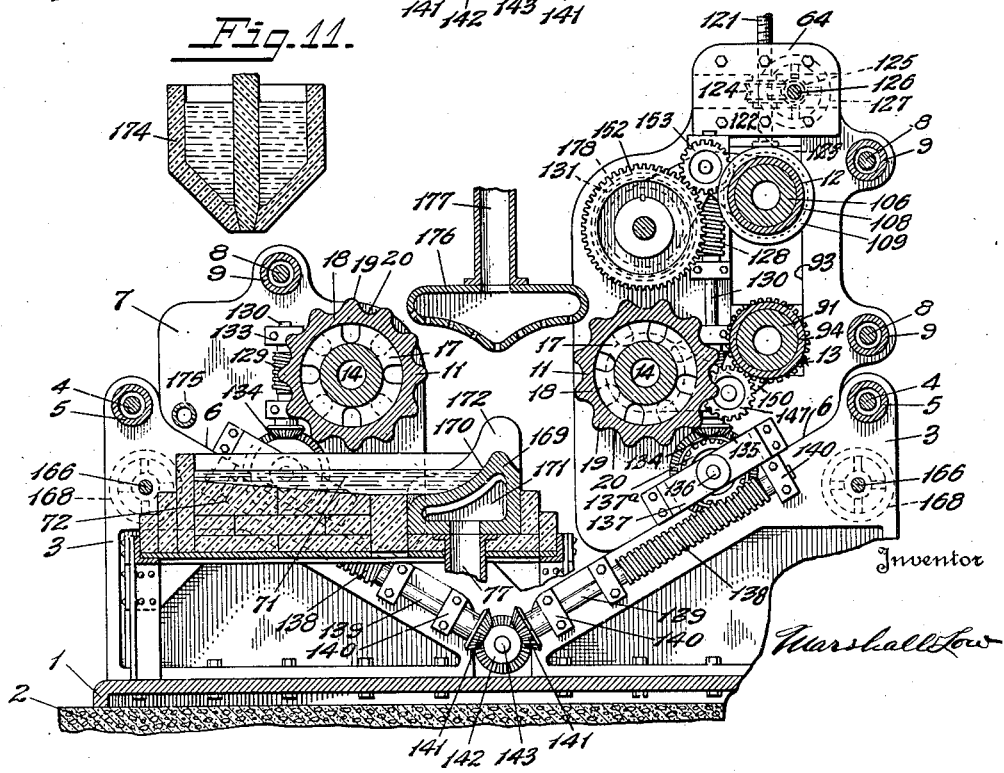
Figure 11 is a view similar to Fig. 10, but illustrating the rolls in their separated or inoperative positions.

In Figures 10 and 11 there is shown another embodiment of the invention in which only the lower rolls 11 are employed to fabricate a single sheet and in which only one of the lower rolls is employed to feed the material. In this particular construction an abutment 169 is provided having a single curved surface 170 adapted to be engaged by the elevations 19 of only one of the lower rolls 11. The abutment 169 is provided with a chamber 171 adapted to be supplied with a temperature controlling medium as in the construction hereinbefore described. The abutment 169 is formed with upwardly extending wing portions or flanges 172 at each end which cooperate with the ends of the associated roll 11 to prevent the escape of material longitudinally from the depressions 20. The two lower rolls cooperate to define a chamber 173 and function in other respects similar to the construction previously described, in fabricating a sheet.

In this construction molten metal or other material may be supplied to the forehearth from a ladle 174 located at one side of the feeding rolls 11 and the metal may be cooled to some extent prior to its contact with the rolls 11, by directing a stream or streams of cold air against the metal from a pipe 175.

Also the sheet of metal may be additionally cooled by directing jets of cold air downwardly against the sheet from a jacket 176 disposed above the rolls 11 and supplied with cold air under compression or live steam from a pipe 177. In view of the fact that the upper rolls are dispensed with in this construction the right hand carriage member 7 may be additionally braced by a tie bolt 178 which serves as a shaft to rotatably support the upper gear wheel 152 and a worm gear 179 which is fixed to one side thereof for driving engagement with the upper elongated worm 138.

It will be noted that in this embodiment of the invention the right hand roll 11, which is not immersed in the metal, cooperates with the left hand or feeding roll merely to shape the sheet, the elevations of the right hand roll displacing a portion of the material contained in the depressions of the left hand roll and distributing the same over the adjacent elevations of this roll and into molecular union with the material similarly displaced from the adjacent depressions so as to form a continuous sheet of corrugated configuration. The rolls 11 rotate at such speed that the metal delivered to the chamber 173 has reached such a degree of plasticity that it will not have time to flow downwardly between the abutment 169 and the right hand roll 11 before it is engaged by an elevation 19 and swept upwardly between the rolls.

Figure 13:
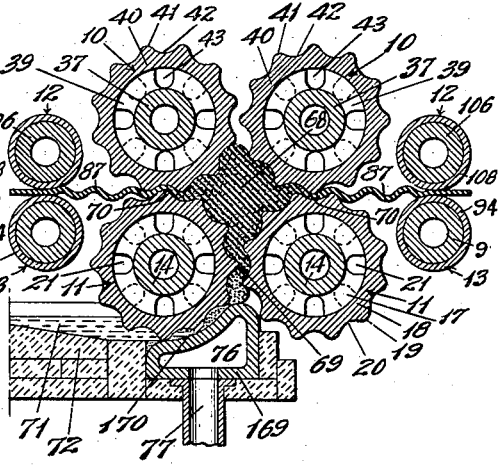
Figure 13 is a view similar to Fig. 12 and illustrating one of the lower rolls only employed to feed the material.

Obviously an abutment having a single roll cooperating surface may be employed in the apparatus illustrated in Figs. 1 to 9 if desired, as is diagrammatically shown in Fig. 13. In such case only one half the amount of material will be fed to the chamber 68 and through the passes 70 and therefore the upper rolls 10 will be adjusted downwardly so as to shape sheets of less thickness. However, the amount of metal fed upwardly by the lower rolls depends upon the depth of the depressions 20 and the spacing of the several rolls, and this may readily be determined.

Figure 14:
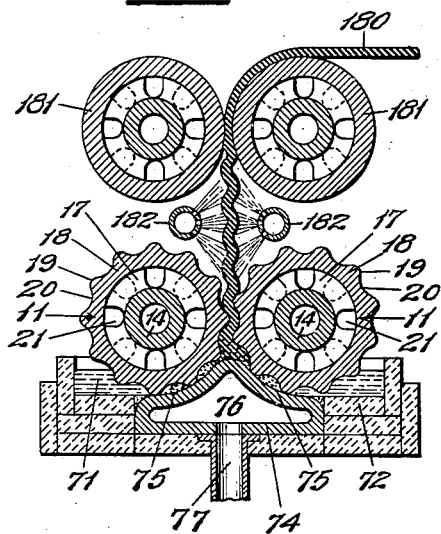
Figure 14 is a diagrammatic vertical sectional view illustrating a structure in which both of the lower rolls are employed to feed the material, which construction is disclosed in the application of which this application is a continuation.

In Fig. 14 there is diagrammatically illustrated an apparatus similar to that disclosed in applicant's copending case Serial No. 614,239 and in which both of the lower rolls 11 cooperate with a bridging member or abutment 74 having two curved surfaces 75 and functioning in the manner hereinbefore described to fabricate a single sheet 180. In this construction two flattening rolls 181 are disposed directly above the rolls 11 and the sheet is additionally cooled by cold air projected against opposite sides of the sheet from pipes 182.

Figure 15:
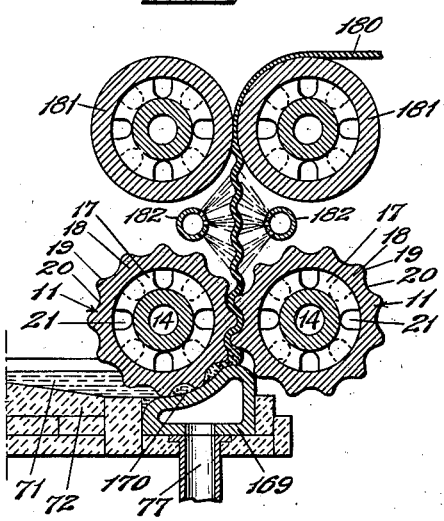
Figure 15 is a view similar to Fig. 14 but illustrating one of the lower rolls only employed to feed the material.

In Figure 15 there is diagrammatically illustrated an apparatus similar in all respects to that shown in Fig. 14 except an abutment 169 having a single curved surface 170 is employed. It will be observed by comparing this figure with the structure shown in Fig. 14 that by reason of the fact that only one of the rolls 11 is employed to feed the material the sheet is one half as thick as when both rolls are utilized for feeding the material.

Obviously, if the cooling and shaping rolls 10 and 11 are rotated too rapidly with respect to the rate at which the metal in the chamber 68 dissipates its heat, the metal will not become sufficiently solidified to retain its sheet form after passing through the pass between the rolls. On the other hand, if the rolls are rotated too slowly the metal may reach such a degree of solidity as to subject the rolls to excessive strain if not actually "freezing" while in contact therewith. Also, the temperature of the metal as well as that of the cooling medium flowing through the rolls may fluctuate to such an extent and so frequently as to render any constant roll speed impractical.

According to the present invention these difficulties and uncertainties are avoided by the provision of thermo-responsive means for automatically varying the speed of the motor M and that of the rolls 10 and 11 in accordance with the temperature of the metal and any fluctuations therein.

With reference to Fig. 16 of the drawings, the armature winding of the motor M is shown as being energized by direct current which traverses a circuit from a suitable source, such as positive bus wire 183, through wire 184, armature winding of motor M, and wire 185 to negative bus wire 193. The field winding of motor M is also energized by current which traverses a circuit from positive bus wire 183, wires 184 and 184', field winding f of motor M, wire 185', manually operable switch 186, wire 187, manually adjustable rheostat 188, wire 189, back contacts 190, and connecting wires 191 of a series of relays, indicated by the letter w with exponents according to their location, and wire 192 to negative bus wire 193. Under these conditions the motor M will drive the cooling and shaping rolls 10 and 11 at a speed determined by the manual adjustment of the rheostat 188 and the rolls will fabricate a sheet, as previously described, if the metal dissipates its heat at the proper rate at such roll speed.

The speed of the motor M is automatically controlled by a thermocouple T which is positioned adjacent to the molten metal within the forehearth 72 or ladle 73 or within the chamber 68 between the rolls 10 and 11 or both, so that the temperature thereof will generate an electric current in the well known manner in a circuit including wires 194 and 195 connecting the terminals of the thermocouple T with those of a galvanometer G. The hot end of the thermocouple T is suitably connected to the outer end of a metal bar 196 the inner end of which is exposed to the hot metal and which is provided with a suitable heat insulating covering 197 so as to insure a uniform drop in temperature from end to end. The temperature of the inner end of the bar 196 is that of the metal but the drop in temperature longitudinally of the bar is such as to prevent the thermocouple T from being damaged by being subjected to excessive heat. However, sufficient heat is transmitted to the thermocouple T by conduction to insure that the same will operate properly in accordance with fluctuations in the temperature of the metal within the forehearth 72.

The galvanometer G operates a disk or shutter 198 provided with an aperture 199 through which light rays emanating from a source of light, such as an electric lamp 200, may be progressively admitted into a series of chambers $c$. Located within each of the chambers $c$ is a selenium cell or resister $s$ and also a lens $l$ for focusing the light admitted through the aperture 199 upon the light sensitive element of the cells $s$.

When the temperature of the metal within the forehearth 72 reaches a predetermined degree, the galvanometer G will swing the shutter 198 to a position in which its aperture 199 registers with the first chamber $c^1$ of the series so that light from the lamp 200 will be focused upon the selenium cell $s^1$ thus rendering the light sensitive element thereof sufficiently conductive to effect the energizing of relay $w^1$ by current traversing a circuit from positive bus wire 183, through a manually adjustable resistance 201, wires 202 and 203, light sensitive element of the selenium cell $s^1$, wire 204, winding of relay $w^1$, and wires 205 and 206 to the negative bus wire 193. The energizing of the relay $w^1$ causes it to open its back contact 190 and to close a front contact 207 thereof. This opens the circuit previously traced for the motor M but establishes an auxiliary circuit therefor through the first section $r^1$ of a resistance element R, front contact 207 of relay $w^1$ and a wire 208 to the negative bus wire 193. The introduction of this additional resistance $r^1$ into the motor circuit causes the speed of the motor and that of the rolls to decrease a predetermined amount so as to allow a greater time for the metal to dissipate its heat and reach the desired degree of plasticity before passing between the rolls.

If the speed of the rolls is still too high to permit the metal to become sufficiently plastic to retain its sheet form after passing between the rolls, the galvanometer G will swing the shutter 198 until the aperture 199 therein registers with the next adjacent chamber $c^2$ of the series so that light from the lamp 200 will render the next succeeding selenium cell $s^2$ electrically conductive and cause the energizing of the relay $w^2$. The energizing of the relay $w^2$ introduces the next section $r^2$ of the resistance R in the motor circuit so as to cause the motor M to rotate at a still further reduced speed. It will be understood that when the front contact 207 of one of the succeeding relays $w$ is closed, as above described, the front contact 207 of the preceding relay $w$ is opened so that the current will be compelled to traverse all of the sections $r$ of the resistance R which are introduced into the circuit by the closing of the front contact 207 of the relay last energized. The above described operations are repeated successively until the desired amount of resistance is included in the circuit of the motor M.

It will be understood that the chambers $c$ are impervious to light except when the aperture 199 in the shutter 198 is moved into registry therewith. Also, it will be understood that suitable amplifying means may be provided in the circuits of the several selenium cells if so desired.

For the purpose of illustration, the current is schematically shown as passing directly through the contacts 190 and 207 of the relays $w$, but it will be appreciated by those skilled in the art that the contacts of these relays may be employed to energize auxiliary circuits including circuit makers and breakers of a type particularly adapted to carry the current employed, especially where normally high current values are to be dealt with.

The hereinabove described control system is given by way of example only, it not being intended to limit the instant improvements to any particular circuit or circuits.

The apparatus thus far has been described for use in connection with rolling metallic sheets and bars from metal delivered thereto in a molten state but it will be readily apparent to those skilled in the art that the apparatus is adaptable for use in connection with the fabrication of plate and sheet glass and that a reinforcing wire fabric, such as that known as chicken wire, may be incorporated therein with little or no change in structure.

The rolls 10 and 11 may be constructed of a refractory composition containing a relatively high proportion of graphite or these rolls may be constructed of cast metal with their surface impregnated or otherwise treated with graphite in order to prevent the material whether metal or glass from sticking thereto.

From the foregoing it will be apparent that an apparatus is provided in which material delivered thereto in a fluid or molten condition may be segregated into separate relatively small bodies and subjected to uniform cooling action entirely around such bodies, thus greatly increasing the rate of solidification. The bodies thus rendered plastic are united with one another under pressure and further cooled and compressed to form a relatively self supporting strip or sheet which may thereafter be further reduced in thickness and cooled to provide a plurality of bars or sheets of metal or other material requiring little or no additional finishing operations. It will also be apparent that, not only is the speed of operation materially increased by the accelerated cooling above referred to, but that the feed of the material is positive and uniform in its action irrespective of the level of the supply of fluid material in the pool.

Moreover, by reason of the kneading action of the rolls 10 and 11, the crystals of metal which are formed as the metal solidifies, are broken down and compacted so as to produce a sheet of relatively great density. Any gases or air which may be trapped in the metal is expelled by such kneading action, thereby resulting in the finished sheet of more uniform density throughout its area than heretofore.

The efficiency of operation of the apparatus depends largely upon the proper regulation of the volume of cooling medium which is passed through the apparatus, so that the various operating elements will properly be protected and so that the metal or other material which is being operated upon, will be cooled to the proper degree of plasticity without reducing its temperature to a point where the operation of the apparatus may be impaired. The cooling means herein illustrated and described may be modified as desired and the medium may be refrigerated before passing through the several parts.

Also, the metal may be subjected to a preliminary cooling before it is introduced into the forehearth 72.

If desired, the material may be fed downwardly between the upper rolls 11, as disclosed in my co-pending application Serial No. 636,080 without in any way altering the construction of the apparatus.

It will be understood that petcocks may be provided where necessary for permitting the escape of steam and air which may become trapped in the system and also for draining the system when not in use and for permitting the escape of steam condensed in the system when live steam is employed as a temperature controlling medium. Also, safety valves may be provided at appropriate points so as to eliminate the danger of explosion in the event that the operation of the apparatus should from any cause be discontinued or interrupted when there is molten metal within the forehearth 72 and water trapped within the system.

It will be apparent from the foregoing that the apparatus is capable of fabricating either one or two sheets and that when the lower rolls 11 are adjusted away from the bridging member or abutment 167, a film of metal will build up on the curved surfaces 168 of the abutment which will have a radius of curvature equal to that of the lower rolls, thus insuring that the rolls and abutment maintain their proper sealing relation with one another.

If desired, the carriage members 7 and the rolls 10 and 11 journaled therein may be moved to and from their operative positions by means of suitable fluid pressure jacks. These carriage members may be suitably keyed to the frame members 3 to prevent their longitudinal displacement and these keys may be in the form of rollers engaging channels provided in the end frame members 3 and the lower faces of the carriage members 7.

Such modifications require little or no additional change in the structure hereinbefore described.

When the apparatus is employed to roll iron or steel or other metals having relatively high melting points it may be desirable to reduce the temperature of the metal to a predetermined degree prior to introducing the same to the apparatus. This may be accomplished by passing the molten metal through a series of chambers and extracting heat therefrom in controllable amounts according to a temperature gradient determined by the initial temperature of the metal and the characteristics of the particular metal to be rolled. This particular feature of the invention is, however, the subject of another application, Serial No. 734,349, filed on even date herewith. Also, the rate of flow of the metal through the several chambers may be automatically controlled in accordance with the rate at which the heat is dissipated from the metal. In the case of most metals the chambers should be closed to the outer atmosphere so as to prevent or minimize oxidation. The temperature of the metal may be reduced either by circulating a suitable cooling medium such as air, steam or water through jackets surrounding the several chambers or by directing currents of inert gas, such as atmospheric air from which the oxygen content has been removed or consumed, through the chambers and in direct contact with the metal.

Other modifications and changes in proportion and arrangement of the several necessary elements constituting the invention may be made by those skilled in the art without departing from the nature and scope of the invention as defined in the appended claims.

What is claimed is:

1. Apparatus of the character described comprising a pair of horizontally disposed lower rolls arranged in side by side relation; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation to provide two oppositely disposed sheet forming passes; an abutment disposed adjacent said lower rolls at the entrance to said chamber, the elevations of at least one of said lower rolls cooperating with said abutment when said rolls are rotated, to segregate successive quantities of plastic material from a supply of such material and to convey the same upwardly through said entrance into said chamber and thence outwardly therefrom in opposite directions through said passes to be fabricated by the corresponding rolls of said pairs of rolls into two sheets of substantially corrugated configuration, and means for automatically controlling the speed of rotation of said rolls in accordance with the plasticity of said material.

2. Apparatus of the character described comprising a pair of horizontally disposed lower rolls arranged in side by side relation; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation to provide two oppositely disposed sheet forming passes; an abutment disposed adjacent said lower rolls at the entrance to said chamber, the elevations of at least one of said lower rolls cooperating with said abutment when said rolls are rotated, to segregate successive quantities of plastic material from a supply of such material and to convey the same upwardly through said entrance into said chamber and thence outwardly therefrom in opposite directions through said passes to be fabricated by the corresponding rolls of said pairs of rolls into two sheets of substantially corrugated configuration; and means for moving the roll having its elevations cooperating with said abutment, away from said abutment and out of operative relation to said supply of material to interrupt the conveying of material to said chamber.

3. Apparatus of the character described comprising a pair of horizontally disposed lower rolls arranged in side by side relation; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation to provide two oppositely disposed sheet forming passes; an abutment disposed adjacent said lower rolls at the entrance to said chamber, the elevations of at least one of said lower rolls cooperating with said abutment when said rolls are rotated, to segregate successive quantities of plastic material from a supply of such material and to convey the same upwardly through said entrance into said chamber and thence outwardly therefrom in opposite directions through said passes to be fabricated by the corresponding rolls of said pairs of rolls into two sheets of substantially corrugated configuration; means for moving the roll having its elevations cooperating with said abutment away from said abutment and out of operative relation to said supply of material to interrupt the conveying of material to said chamber; and means for rotating said roll when the same is thus moved.

4. Apparatus of the character described comprising a pair of horizontally disposed lower rolls arranged in side by side relation; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation to provide two oppositely disposed sheet forming passes; an abutment disposed adjacent said lower rolls at the entrance to said chamber, the elevations of at least one of said lower rolls cooperating with said abutment when said rolls are rotated, to segregate successive quantities of plastic material from a supply of such material and to convey the same upwardly through said entrance into said chamber and thence outwardly therefrom in opposite directions through said passes to be fabricated by the corresponding rolls of said pairs of rolls into two sheets of substantially corrugated configuration; means for separating said rolls to provide access therebetween; and means for rotating said rolls when the same are separated.

5. Apparatus of the character described comprising a receptacle for containing a supply of plastic material; a pair of horizontally disposed lower rolls arranged in side by side relation, and at least one of said lower rolls extending downwardly into said receptacle and into sealing relation to a material confining surface thereof; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation at the line of nearest approach therebetween to provide two oppositely disposed sheet forming passes, the roll in said receptacle cooperating with said surface when said rolls are rotated to segregate successive quantities of material from said supply and to convey the same into said chamber and thence outwardly therefrom in opposite directions through said passes to be fabricated by the corresponding rolls of said pairs of rolls into two sheets of substantially corrugated configuration, and means for automatically controlling the speed of rotation of said rolls in accordance with the plasticity of said material.

6. Apparatus of the character described comprising a receptacle for containing a supply of plastic material; a pair of horizontally disposed lower rolls arranged in side by side relation, and at least one of said lower rolls extending downwardly into said receptacle and into sealing relation to a material confining surface thereof; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation at the line of nearest approach therebetween to provide two oppositely disposed sheet forming passes, the roll in said receptacle cooperating with said surface when said rolls are rotated to segregate successive quantities of material from said supply and to convey the same into said chamber and thence outwardly therefrom in opposite directions through said passes to be fabricated by the corresponding rolls of said pairs of rolls into two sheets of substantially corrugated configuration; and means for elevating the roll in said receptacle out of said receptacle and out of operative relation the material contained therein.

7. Apparatus of the character described comprising a receptacle for containing a supply of plastic material; a pair of horizontally disposed lower rolls arranged in side by side relation, and at least one of said lower rolls extending downwardly into said receptacle and into sealing relation to a material confining surface thereof; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation at the line of nearest approach therebetween to provide two oppositely disposed sheet forming passes, the roll in said receptacle cooperating with said surface when said rolls are rotated to segregate successive quantities of material from said supply and to convey the same into said chamber and thence outwardly therefrom in opposite directions through said passes to be fabricated by the corresponding rolls of said pairs of rolls into two sheets of substantially corrugated configuration; and means for elevating the roll in said receptacle out of said receptacle and out of operative relation to the material contained therein; and means for rotating said roll when the same is elevated.

8. Apparatus of the character described comprising a receptacle for containing a supply of plastic material; a pair of horizontally disposed lower rolls arranged in side by side relation, and at least one of said lower rolls extending downwardly into said receptacle and into sealing relation to a material confining surface thereof; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation at the line of nearest approach therebetween to provide two oppositely disposed sheet forming passes, the roll in said receptacle cooperating with said surface when said rolls are rotated to segregate successive quantities of material from said supply and to convey the same into said chamber and thence outwardly therefrom in opposite directions through said passes to be fabricated by the corresponding rolls of said pairs of rolls into two sheets of substantially corrugated configuration; means for separating said rolls to provide access therebetween.

9. Apparatus of the character described comprising a receptacle for containing a supply of plastic material; a pair of horizontally disposed lower rolls arranged in side by side relation, and at least one of said lower rolls extending downwardly into said receptacle and into sealing relation to a material confining surface thereof; a pair of upper rolls cooperating with said lower rolls to define a chamber therebetween, said upper and lower rolls each having a plurality of circumferentially arranged longitudinally extending elevations and depressions, and said upper and lower rolls being mounted for rotation in unison with the elevations and depressions of the corresponding rolls of said pairs of rolls in constantly registering spaced relation at the line of nearest approach therebetween to provide two oppositely disposed sheet forming passes, the roll in said receptacle cooperating with said surface when said rolls are rotated to segregate successive quantities of material from said supply and to convey the same into said chamber, and thence outwardly therefrom in opposite directions through said passes to be fabricated by the corresponding rolls of said pairs of rolls into two sheets of substantially corrugated configuration; means for separating said rolls to provide access therebetween; and means for rotating said rolls when thus separated.

10. The method of fabricating sheets or bars from plastic material which consists in successively segregating quantities of fluid material from a supply of such material; reuniting the segregated quantities of material to form a homogeneous plastic mass; passing said material into a chamber defined by two adjacent pairs of corrugated rolls, by rotating one of said pairs of rolls adjacent to an abutment, and subsequently shaping said plastic mass into sheet or bar form by passing the same outwardly from said chamber in opposite directions between the corresponding rolls of said pairs of rolls.

11. The method of fabricating sheets or bars from plastic material which consists in successively segregating and elevating quantities of fluid material from a pool of such material, reuniting the segregated quantities of material to form a homogeneous plastic mass, passing said material into a chamber defined by upper and lower pairs of corrugated rolls, by rotating the lower pair of rolls adjacent to an abutment, and subsequently shaping said plastic mass into sheet or bar form by passing the same outwardly from said chamber in opposite directions between the corresponding rolls of said pairs of rolls.

12. The method of fabricating metallic sheets or bars from metal delivered in a molten condition which consists in successively segregating quantities of molten metal from a parent body of such metal, reducing the temperature of the metal thus segregated to render the same relatively plastic, reuniting the segregated quantities of plastic metal to form a homogeneous mass, passing the plastic metal into a chamber defined by two adjacent pairs of corrugated rolls, by rotating one of said pairs of rolls adjacent to an abutment, and subsequently shaping said plastic metal into sheet or bar form by passing the same outwardly from said chamber in opposite directions between the corresponding rolls of said pairs of rolls.

13. The method of fabricating metallic sheets or bars from metal delivered in a molten condition which consists in successively segregating and elevating quantities of molten metal from a pool of such metal, reducing the temperature of the metal thus segregated to render the same relatively plastic, reuniting the segregated quantities of plastic metal to form a homogeneous mass, passing the plastic metal into a chamber defined by upper and lower pairs of rolls, by rotating the lower pair of rolls adjacent to an abutment, and subsequently shaping said plastic mass into sheet or bar form by passing the same outwardly from said chamber in opposite directions between the corresponding rolls of said pairs of rolls.

14. In a plastic-material-shaping apparatus having a chamber provided with two sheet forming outlets therefrom and means for feeding plastic material in segregated quantities successively to said chamber and thence through said outlets; a pair of rotatable rolls provided with a plurality of circumferentially arranged longitudinally extending elevations and depressions, said rolls forming two walls of said chamber, a wall of each of said outlets and portions of said feeding means.

15. In a plastic-material-shaping apparatus having a chamber provided with two sheet forming outlets therefrom and means for feeding molten metal in segregated quantities successively to said chamber and thence through said outlets to shape two sheets or bars simultaneously; a pair of rotatable rolls provided with a plurality of circumferentially arranged longitudinally extending elevations and depressions, said rolls forming two walls of said chamber, a wall of each of said outlets and portions of said feeding means, and means for reducing the temperature of said segregated quantities of metal while being fed to said chamber.

16. In a plastic-material-shaping apparatus having a chamber provided with two sheet forming outlets therefrom and means for feeding molten metal in segregated quantities successively to said chamber and thence through said outlets to shape two sheets or bars simultaneously; a pair of rotatable rolls provided with a plurality of circumferentially arranged longitudinally extending elevations and depressions, said rolls forming two walls of said chamber, a wall of each of said outlets and portions of said feeding means, and means for reducing the temperature of opposite sides of said segregated quantities of metal while being fed to said chamber.

17. In a plastic-material-shaping apparatus having a chamber provided with two sheet forming outlets therefrom and means for feeding plastic material in segregated quantities successively to said chamber and thence through said outlets to shape two sheets or bars simultaneously; a pair of rotatable rolls provided with a plurality of circumferentially arranged longitudinally extending elevations and depressions, said rolls forming two walls of said chamber, a wall of each of said outlets and portions of said feeding means, and a receptacle for containing a supply of plastic material, one of said rolls extending into proximity to a material confining surface of said receptacle.

18. In a plastic-material-shaping apparatus having a chamber provided with two sheet shaping outlets therefrom and means for feeding plastic material in segregated quantities successively into said chamber and for feeding said material from said chamber through said outlets in sheet form; a pair of rotatable rolls provided with a plurality of circumferentially arranged longitudinally extending elevations and depressions, said rolls acting on said material to form the sheet with an undulatory surface; flattening rolls associated with said corrugated rolls for removing the undulations from said sheet, and means for rotating said flattening rolls in synchronism with said corrugated rolls and at an increased rate of speed to prevent material from accumulating between said corrugated rolls and said flattening rolls occasioned by the attenuation of said sheet when the undulations therein are removed.

19. Apparatus of the character described comprising a pair of horizontally disposed lower rolls; a pair of horizontally disposed upper rolls cooperating with said lower rolls to define a chamber therebetween, said lower rolls being spaced from one another to provide an entrance to said chamber and said upper rolls being spaced from said lower rolls to provide two oppositely disposed sheet forming passes, said upper and lower rolls each having a plurality of circumferentially arranged longitudinally extending elevations and depressions; and an abutment disposed adjacent to said lower pair of rolls at the entrance to said chamber, the elevations of at least one of said lower rolls cooperating with said abutment when said rolls are rotated, to segregate successive quantities of plastic material from a supply of such material and to convey the same upwardly through said entrance into said chamber, and all of said rolls cooperating to move said material from said chamber outwardly in opposite directions through said passes to be fabricated by the corresponding rolls of said pairs of rolls into two sheets of substantially corrugated configuration.

20. Apparatus of the character described comprising a pair of horizontally disposed lower rolls; a pair of horizontally disposed upper rolls cooperating with said lower rolls to define a chamber therebetween, said lower rolls being spaced from one another to provide an entrance to said chamber and said upper rolls being spaced from said lower rolls to provide two oppositely disposed sheet forming passes, said upper and lower rolls each having a plurality of circumferentially arranged longitudinally extending elevations and depressions, and an abutment disposed adjacent to said lower rolls at the entrance to said chamber, the elevations of both of said lower rolls cooperating with said abutment when said rolls are rotated, to segregate successive quantities of plastic material from a supply of such material and to convey the same upwardly through said entrance into said chamber and thence outwardly therefrom in opposite directions through said passes to be fabricated by the corresponding rolls of said pairs of rolls into two sheets of substantially corrugated configuration.

21. Apparatus of the character described comprising a receptacle for containing a supply of plastic material; and a pair of horizontally disposed lower rolls, and at least one of said lower rolls extending downwardly into said receptacle and into sealing relation to a material confining surface thereof; a pair of upper rolls cooperating with said lower rolls to define a chamber therebetween, said lower rolls being spaced from one another to provide an entrance to said chamber and said upper rolls being spaced from said lower rolls to provide two oppositely disposed sheet forming passes, said upper and lower rolls each having a plurality of circumferentially arranged longitudinally extending elevations and depressions, the roll in said receptacle cooperating with said surface when said rolls are rotated to segregate successive quantities of material from said supply and to convey the same upwardly into said chamber through said entrance, and all of said rolls cooperating to move said material from said chamber outwardly in opposite directions through said passes to be fabricated by the corresponding rolls of said pairs of rolls into two sheets of substantially corrugated configuration.

22. Apparatus of the character described comprising a receptacle for containing a supply of plastic material; and a pair of horizontally disposed lower rolls, and both of said lower rolls extending downwardly into said receptacle and into sealing relation to a material confining surface thereof; a pair of upper rolls cooperating with said lower rolls to define a chamber therebetween, said lower rolls being spaced from one another to provide an entrance to said chamber and said upper rolls being spaced from said lower rolls to provide two oppositely disposed sheet forming passes, said upper and lower rolls each having a plurality of circumferentially arranged longitudinally extending elevations and depressions, both of said rolls cooperating with said surface when said rolls are rotated to segregate successive quantities of material from said supply and to convey the same upwardly into said chamber through said entrance and thence outwardly therefrom in opposite directions through said passes to be fabricated by the corresponding rolls of said pairs of rolls into two sheets of substantially corrugated configuration.

23. Apparatus of the character described comprising: a pair of lower rolls mounted for rotation in spaced relation about horizontal axes and having a plurality of alternately arranged longitudinally extending circumferential elevations and depressions; a pair of upper rolls mounted for rotation in spaced relation above said lower rolls about horizontal axes and also having a plurality of alternately arranged longitudinally extending circumferential elevations and depressions, the elevations in one of said lower rolls being adapted to register with the depressions in the other of said lower rolls and the elevations in said upper rolls being adapted to register with the depressions in said lower rolls; a bridging member disposed between said lower rolls below the axes of rotation thereof and provided with curved surfaces having radii of curvature substantially equal to the maximum radii of curvature of said lower rolls; means for cooling said lower rolls and said bridging member; means for rotating said rolls to cause said lower rolls to segregate successive bodies of molten metal from a parent body of such metal, to move the same in proximity to said bridging member to subject the metal thus segregated to the cooling action thereof, to compress the metal thus cooled between said lower rolls, to deliver the metal thus compressed to the space between said lower and said upper rolls, and to carry said metal horizontally outwardly between said lower rolls and said upper rolls to form a plurality of sheets of metal having a substantially corrugated configuration; retaining members cooperating with the ends of said upper and lower rolls and with said bridging member for preventing the escape of metal longitudinally from said depressions; means for cooling the metal delivered to said space and cooperating with said rolls in directing said metal outwardly therebetween; and means for reducing the thickness of said sheets and for removing the corrugations therefrom.

24. In a plastic-material-shaping apparatus having a chamber provided with two sheets forming outlets therefrom and means for feeding plastic material in segregated quantities successively to said chamber and thence through said outlets to shape two sheets or bars simultaneously; a pair of rotatable rolls provided with a plurality of circumferentially arranged longitudinally extending elevations and depressions, said rolls forming two walls of said chamber, a wall of each of said outlets and portions of said feeding means; and means disposed in movable engagement with the ends of said rolls for preventing the escape of material from said chamber longitudinally of said rolls.

25. Apparatus of the character described comprising: a pair of lower rolls mounted for rotation in spaced relation about horizontal axes and having a plurality of alternately arranged longitudinally extending circumferential elevations and depressions; a pair of upper rolls mounted for rotation in spaced relation above said lower rolls about horizontal axes and also having a plurality of alternately arranged longitudinally extending circumferential elevations and depressions, the elevations in one of said lower rolls being adapted to register with the depressions in the other of said lower rolls and the elevations in said upper rolls being adapted to register with the depressions in said lower rolls; a bridging member disposed between said lower rolls below the axes of rotation thereof and provided with curved surfaces having a radii of curvature substantially equal to the maximum radii of curvature of said lower rolls; means for cooling said lower rolls and said bridging member; means for rotating said rolls to cause said lower rolls to segregate successive bodies of molten metal from a parent body of such metal, to move the same in proximity to said bridging member to subject the metal thus segregated to the cooling action thereof, to compress the same between said lower rolls, to deliver the metal thus compressed to the space between said lower and said upper rolls and to carry said metal horizontally outwardly between said lower rolls and said upper rolls to form a plurality of sheets of metal having a substantially corrugated configuration; retaining members cooperating with the ends of said upper and lower rolls and with said bridging member for preventing the escape of metal longitudinally from said depressions; a pair of flattening rolls spaced laterally from said upper and lower rolls for reducing the thickness of each of said sheets and for removing the corrugations therefrom; and means for incorporating a metallic reinforcing member within each of the sheets fabricated by said upper and lower rolls, said members being adapted to lead said sheets between said flattening rolls and to support the same against excessive sagging during their passage thereto.

MARSHALL LOW.